June 17, 1930.  B. A. SPINNEY  1,764,811
SELF ADJUSTING TIRE CHAIN DEVICE
Filed July 2, 1928
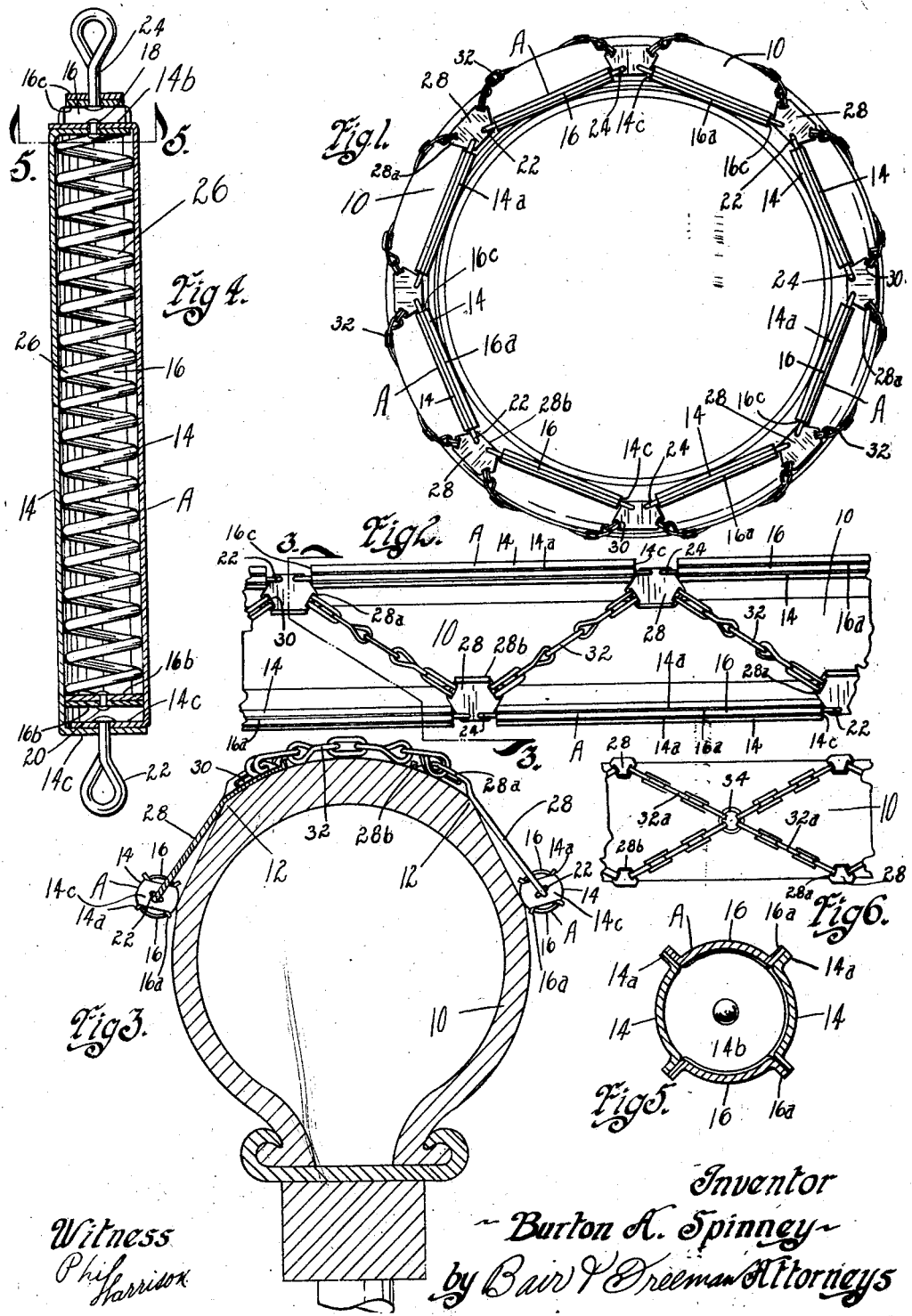
Inventor
Burton A. Spinney
by Bair & Freeman Attorneys
Witness
Phil Harrison Patented June 17, 1930

1,764,811

UNITED STATES PATENT OFFICE

BURTON A. SPINNEY, OF DES MOINES, IOWA

SELF-ADJUSTING TIRE-CHAIN DEVICE

Application filed July 2, 1928. Serial No. 289,805.

The object of my invention is to provide a non-skid device of a self-adjusting type, so constructed and arranged that it may be mounted on a tire on an automobile or the like without the use of tools by simply tensioning certain parts, which when assembled on the car will hold the device properly tensioned, so that it can not be accidentally lost.

A further object of my invention is to provide a series of diagonally arranged loose flexible chains or the like to extend across the tread of the tire and to connect the chains at their ends on the opposite sides of the tire by means of annular elements including tension members, preferably comprising compressible springs each arranged in a novel casing.

With these and other objects in view, my invention consists in the construction, arrangement and combination of the various parts of my self-tensioning non-skid device, whereby the objects contemplated are attained, as hereinafter more fully set forth, pointed out in my claims, and illustrated in the accompanying drawings, in which:

Figure 1 shows a side elevation of my improved self-tensioning non-skid device assembled on a vehicle tire.

Figure 2 is a top or plan view of a short section of the assembly shown in Figure 1.

Figure 3 is a detail, sectional view taken on the line 3—3 of Figure 2.

Figure 4 is a longitudinal, sectional view through one of the tensioning springs and its case.

Figure 5 is a detail, sectional view taken on the line 5—5 of Figure 4; and

Figure 6 is a plan view of a slightly modified form of my device.

In the accompanying drawings, I have used the reference numeral 10 to indicate generally a pneumatic tire. A great many tires, as now manufactured, have treads which are thicker at their side walls, and so that shoulders 12 are formed at the edges of the treads.

My improved self-tensioning non-skid device comprises annular members, which are intended to be at the sides of the tire when the device is installed on the tire, which annular members are composed in each instance of a series of resilient elements connected together in a way which will be hereinafter described.

I shall first describe one of the resilient elements. Each element comprises a casing indicated generally at A. Each casing A comprises two halves made up of opposite members 14 and 16 respectively. The members 14 and 16 have the form of a hollow, quarter cylinder.

The members 14 are opposite each other and the members 16 are opposite each other.

Each of the members 14 and 16 has along its longitudinal edges outwardly extending flanges $14^a$ and $16^a$ respectively. At one end of the members 14, they have formed integrally with their bodies overlapping disc-shaped end members $14^b$. The members $14^b$ at one end are secured together by a rivet or the like 18.

At the other end of the members 14 are similar overlapping disc members $14^c$.

The members $14^b$ and $14^c$ are arranged to form end members to keep out dust, mud and the like.

At one end of the members 16 are overlapping discs $16^b$ secured integrally to the respective members 16 and connected together by a rivet 20. At the other end of the members 16 are corresponding disc-shaped end members $16^c$.

An I-bolt 22 is secured to the members $14^c$ and a similar I-bolt 24 is secured to the members $16^c$.

Received within the casing formed by the members 14 and 16 is a compressible coil spring 26. By pulling on the respective I-bolts 22 and 24, the spring is compressed between the members $14^b$ and $16^b$.

On each side of the tire, a series of the compressible elements A are connected together into an annular member.

Between each successive pair of resilient elements A is a plate 28, preferably of sheet metal, to which the adjacent I-bolts 22 and 24 of two adjacent members A are secured near one edge, as illustrated for instance in Figure 2.

Each plate 28 projects from the members A circumferentially around the tire toward the tread thereof. Each plate 28 is formed with an inclined portion 28ª extending slightly over the tread portion of the tire. The portion 28ª is formed at its edge farthest from the members A with an out-turned edge 28ᵇ. The portion 28ª is formed with spaced, inclined slots 30. The portions of the parts 28ª having the slots 30 are slightly out-turned.

The plates 28 on opposite sides of the tire are connected together by a series of diagonally inclined chains 32, which are secured to the portions 28ª of the plates 28 by extending links of the chain through the holes 30.

In Figure 2, I have shown an arrangement of these chains, which, taken together and with the plates 28, form one continuous connection.

In Figure 6, I have shown the chains aranged to be connected at the middle of the tire by rings 34, the chains in the modified form being indicated by the reference numeral 32ª.

Thus the annular members, resilient elements A, and the plates 28 on each side of the tire are connected together by the chains 32 or 32ª.

In the installation of a self-tensioning, non-skid device of the kind herein described, the user simply puts a portion of the device over a portion of the tire, and then by stretching one of the annular members, the device can be forced into position on the tire, and will automatically tension itself. There will be enough play to allow some creep of the whole device around the tire, so that the non-skid chains will not wear the tire excessively in certain places.

The advantage of being able to put on the chains by simply fitting over the tire is a matter of great importance. Such a device can be put on quickly and easily.

It will always properly tension itself, so that it will not be loose, and so that there are no parts left to strike the fenders or other parts of the car, and so that there is no danger of the device accidentally coming off, because it might be too loose.

The tension on both sides of the device will hold it properly centered, and I find that the bearing of the plates against the shoulders 12 helps to keep the whole device centered, because the device tends to adjust itself to position where the shoulders 12 fit the bend between the main body of the plate 28 and its part 28ª.

No hooks or tools are required for putting the device on the car. There are no loose parts. The device will automatically adjust itself to maintain its tension. It can creep enough to prevent excessive wear. The springs are projected from dirt, pebbles and weather. Compression springs are not likely to be broken, and if one should break, the device will not accidentally come off.

It will, of course, be understood that the disc members 16ᵇ and 14ᵇ are of such a size as to slide between the members 14 and 16.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. In a device of the class described, a resilient member comprising a casing formed with two halves, said halves being composed of opposite, spaced members, each in the shape of a quarter cylinder, the halves being slidably connected together and having at their ends disc-shaped end members, whereby an extensible closed housing is formed and a coil spring in said housing.

2. In a device of the class described, a resilient element comprising a casing made of two halves slidably connected together and formed with end members, a coil spring in said casing, and completely housed thereby throughout the entire contractive and expansive movement of the spring.

3. A tensioner comprising a pair of frame members each having ends and sides, said members being telescopically arranged with one end of one member between the ends of the other member, the sides of said members alternating edge to edge for forming a closed casing and resilient extensible means in said casing and housed thereby regardless of the telescopic position of one frame member relative to the other.

4. A tensioner comprising a casing composed of a plurality of sections arranged edge to edge, a plurality of end members connected with the ends of alternate ones of said sections, attaching devices at opposite ends of said tensioner and connected with certain of said end members and a spring interposed between the remaining end members at opposite ends of said tensioner and located inside of the sections of said casing whereby to be completely enclosed in all positions of contraction or expansion thereof.

BURTON A. SPINNEY.